Patented July 12, 1938

2,123,732

UNITED STATES PATENT OFFICE 2,123,732

CATALYST COMPOSITION AND METHOD OF MAKING SAME

Christian W. Keitel, West Orange, and Thomas J. Walsh, Newark, N. J., assignors to Baker & Co., Inc., Newark, N. J., a corporation of New Jersey No Drawing. Application June 2, 1936, Serial No. 83,070

4 Claims. (Cl. 23—233)

This invention relates to catalysts, and particularly to contact masses and methods of making the same.

It has been customary in the formation of contact masses for use in various operations, as, for example, in the oxidation or reduction of various compounds in the gaseous or liquid phase, to provide contact masses consisting essentially of a carrier, usually of porous material, impregnated with a metal or metal compound, or a mixture containing the same. In the case of certain metals, particularly of the platinum group, the cost of making the contact mass is high because of the relatively high cost of the platinum.

In the past, several methods of depositing the metal have been used. For example, a solution was made of platinum chloride in water containing sodium carbonate, sodium acetate and sodium formate, with which the carrier was impregnated and the mass was then gently heated on a water bath to cause reduction to take place by means of the formate to give metallic platinum. In another proposed process, the platinum salt was made up in a solution containing such compounds as methyl alcohol, acetone, methyl acetate, or the like. The carrier was impregnated therewith and ignited, whereby reduction of the platinum was obtained. Another proposed process was to make salts of the metal with certain organic acid compounds such as nitrophenols, sulpho-acids and the like, saturate the carrier therewith, evaporate the solvent, and then heat in order to cause combustion or decomposition to take place to deposit the metal.

These various processes were successful in that they produced catalysts, but the amount of metal deposited therein was necessarily relatively large, making the catalysts expensive where a platinum metal was used.

It is among the objects of the present invention to provide a contact mass which shall embody any of various metals and specifically metals of the platinum group in which a minimum amount of such metal is used while at the same time providing a highly effective and active catalyst.

In the practice of the present invention, there is provided a catalyst having a catalytic metal applied to the surface of the carrier only and avoiding substantially completely the penetration of the metal into the body or into the pores of the carrier.

Our invention is based upon the conception that if a solution containing a compound of the catalytic metal is caused to come in contact with the carrier while the carrier is at a sufficiently elevated temperature to cause substantially instantaneous vaporization of the solvent used, the metal will be deposited on the surface only of the carrier in a thin and uniform film, thus utilizing a minimum of metal and still providing a catalyst having high efficiencies. The reaction velocities obtained by using a catalyst of this character are relatively high. Furthermore, a catalyst according to the present invention permits a lower kindling temperature than has heretofore been possible.

Our catalysts may be used in various reactions, such as oxidation or reduction and they have been applied to the oxidation of $SO_2$ by means of air to $SO_3$ in the manufacture of sulphuric acid. Another reaction in which the present catalyst may be used with success is the oxidation of ammonia to oxides of nitrogen in the production of nitric acid. While platinum is ordinarily used as the catalytic metal in reactions of this type, other platinum metals or mixtures of metals of the platinum group, and even metals outside of the platinum group, may be used in the practice of the present invention.

More specifically, we take a compound of a metal having catalytic properties, which may be dissolved or suspended in a liquid volatile medium, but is preferably dissolved therein. Various liquids may be used, but we prefer such organic compounds as alcohols, ketones, ethers, esters and hydrocarbons and the like. It is, of course, understood that all of such metal compounds are not soluble in all of said solvents. It is highly desirable that the liquid be readily volatile and preferably that it be decomposable under the conditions of the operation so as to act as a reducing agent. The carrier is then heated to a temperature sufficient to cause substantially instantaneous evaporation of the volatile liquid or medium and the decomposition of the metal compound, when the carrier and the liquid medium are brought into contact. With the carrier so pre-heated, the solution or suspension of the metal compound is sprayed or atomized onto the hot carrier. The solvent or suspension medium evaporates substantially instantaneously and the metal compound is decomposed, thus forming a more or less continuous layer of metal on the surface of the carrier without penetrating into the carrier, even though the latter may be porous. In the case of platinum, using platinum chloride as the platinum compound, the temperature for both complete decomposition of the compound and instantaneous evaporation of the liquid medium was found to be variable within wide limits.

It is essential that the carrier be maintained at a sufficient temperature above the reduction temperature of the metal compound so that the heat therein is sufficient for the reduction. A wide range of temperatures may be used, say, 250° C. or more. Higher temperatures may be used and they are generally preferable, as such temperatures make certain that all of the liquid medium is evaporated or preferably burnt and no penetration of the platinum metal into the carrier takes place. We use ordinarily temperatures in the neighborhood of 300–500° C., but temperatures as high as even 1000° C. may be used, depending upon conditions and providing that the temperature used is not so high as to injure the properties of the carrier.

The following examples illustrate the various ways in which our invention may be carried out, although it will be apparent that the method is capable of being varied in a number of different ways.

Example 1

A solution of 10 gr. platinum chloride (40% platinum) was dissolved in 30 cc. of commercial (96%) ethyl alcohol. 400 gr. silica gel were preheated to 450° C. in a muffle oven and then about 12 cc. of the alcohol platinum solution was sprayed on the silica gel by means of an atomizer, stirring the particles during the spraying operation. Platinum deposited on the surface of the silica gel and caused a metallic luster. By analysis it was found that the platinum percentage was slightly below 0.4%. No additional heat had to be employed during the spraying operation and it is evident that the platinum percentage may be increased or decreased at will, eventually after reheating if the object should cool too much in spraying large amounts.

Example 2

Fused silica was heated to 400° C. and sprayed uniformly with an alcohol solution of platinum chloride and rhodium chloride, the rhodium metal being present to the extent of 25% of the total of the metals present. The metallic deposit consisted of an intimate platinum-rhodium mixture, containing 25% rhodium.

Example 3

Long fibered asbestos was first washed in dilute hydrochloric acid, rinsed and dried, spread in a layer about ½ inch thick, heated to 500° C. and sprayed with an atomized alcoholic solution of platinum chloride while raking until the entire surface appeared to be covered with platinum metal. Continuous heating seemed desirable in this particular case because the carrier did not retain the heat long enough when sprayed without further heat supply.

Example 4

Magnesium sulphate pellets were heated to a temperature of 350° C. and sprayed as above.

Example 5

200 gr. of pumice were heated to 400° C. and then sprayed with an alcoholic solution of ruthenium chloride.

Example 6

Similar catalysts were prepared in which palladium chloride was dissolved in acetone and ethyl acetate.

In preparing a catalyst according to our invention, a thin surface layer of metal is formed with negligible penetration of the metal into the carrier itself. Penetration of the metal into the body of the carrier means increased cost of preparation of the catalyst, in proportion to the depth of the penetration. Our method, therefore, by concentrating the metal on the surface, increases the efficiency of the catalyst, without increasing the cost. This is especially important in the case of highly porous carriers such as silica gel, magnesium sulphate, pumice and the like. If such catalysts are prepared according to known methods, the metal will penetrate to a relatively great depth or is distributed practically uniformly in the entire body of the carrier, and we believe that the platinum which is beneath the surface of the carrier has little part, if any, in the activity of such a catalyst. It is one advantage of our method that all the active metal is concentrated at the surface where it can contact the gas stream most readily.

Our method is suitable for the avoiding of the formation of by-products as result from customary chemical reduction in the liquid phase of platinum salts, thus providing a catalyst having a high purity without subsequent washing. This is an advantage of special value in the preparation of catalysts where freedom from deleterious impurities is highly important to insure the highest possible catalytic activity.

Our method of replacing aqueous solutions by alcohol or other organic solvents has the advantage that, in the case of magnesium sulphate, water absorption is avoided; this avoids the hydration of the surface and the subsequent dehydration thereof by heat, whereby the tendency to produce dust and loss of catalytic substance is largely avoided.

When the spray is ignited, a material proportion of the solvent is evaporated and burnt, lessening the mount which must be vaporized by the heat in the carrier. This conserves heat and renders the present process smooth and efficient.

In view of the concentration of the catalytically active metal on the surface exclusively, it appears, therefore, that our method permits economical production of catalysts for oxidation and reduction reactions of all kinds with a minimum of metal applied to the carrier.

We have found that contact catalysts prepared according to our methods show unusually high reaction velocities and low kindling temperatures, and it seems that these properties are caused by the relatively high surface concentration of the platinum and by its high purity.

We have found that, comparing silica gel platinized in our way with silica gel platinized by known methods, our mass showed 1–1.5% better maximum conversion at low gas velocities (15 cc./gr./minute), about 2% better conversion at medium velocities (20 cc./gr./minute) and 4% better conversion at velocities slightly higher than normal (30 cc./gr./minute).

Kindling temperatures are probably dependent on the purity and the concentration of the metal. By using chemically pure platinum salts and concentrating the platinum on the surface exclusively, we have found unusually low kindling temperatures as a characteristic of our mass. Catalysts can be prepared according to our method which will kindle in contact with SO$_2$-air mixture after being preheated to 200° C. while the ordinary method of preparing similar catalysts results in a product which requires a temperature of about 350° C.

Promoters may be added to still further increase the efficiency of the catalyst. They may be added before or after the catalytic metal has been applied and also during the activation of the carrier where the nature of the promoter permits such a procedure.

From the above it will be apparent that our invention is based primarily upon heating the carrier prior to impregnation to a sufficiently high temperature so that upon spraying the solution containing the catalytic metal compound thereon, substantially instantaneous vaporization takes place. In our description, we have given several specific examples of the operation of our invention, but these examples are not to be considered as limiting the invention, but merely as illustrating the character thereof.

While we have specifically set forth metals of the platinum group, it is obvious that metals of other groups are also capable of use in the present invention whether or not reduction of such metals is desired. In some cases, as in vanadium catalysts, for example, the metal remains on the carrier in the form of compounds thereof and the present invention contemplates the treatment of carriers with compounds of such metals whereby they are deposited on the surface only. Other liquids than those specifically named are suitable for solvents for the metal compounds. The metal compound need not be in solution in the liquid medium, but may be suspended in sufficiently finely divided state so as to be readily sprayed onto the carrier. In the treatment of the carrier with the liquid, heat may be applied continuously or the carrier may be first heated, the metal compound sprayed thereon, the carrier heated again, and more of the metal compound sprayed thereon. From the above, it will be apparent that many variations may be made in the details of our invention, and the scope of the invention is not to be limited except by the character of the claims appended hereto.

By "catalytic metal" as used in the claims, we include such metals and compounds thereof as have catalytic properties, and are capable of being deposited and retained on the carrier under the conditions, such as the temperatures, set forth herein, as for instance, osmium will not be retained on a carrier under oxidizing conditions. By "spraying" as used in the claims, we include also the atomization of the liquid used.

What we claim is:—

1. A method of making a catalyst composition which comprises providing a porous carrier material of suitable particle size, heating the same, providing a compound of a catalytic metal intimately dispersed in a liquid organic medium, the temperature of said carrier being above the vaporization point of said liquid, and spraying said liquid onto said carrier, whereby evaporation of said liquid is substantially instantaneous and substantially no penetration into the interior of said carrier takes place.

2. A method of making a catalyst composition which comprises providing a porous carrier material of suitable particle size, heating the same, providing a compound of a catalytic metal intimately dispersed in a combustible organic liquid medium, the temperature of said carrier being above the vaporization point of said liquid, and spraying said liquid onto said carrier, whereby evaporation of said liquid is substantially instantaneous and substantially no penetration into the interior of said carrier takes place, the temperature being sufficiently high to ignite said liquid medium.

3. A method of making a catalyst composition which comprises providing a carrier material of suitable particle size comprising silica gel, heating the same, providing a compound of a catalytic metal intimately dispersed in a liquid organic medium, the temperature of said carrier being above the vaporization point of said liquid, and spraying said liquid onto said carrier, whereby evaporation of said liquid is substantially instantaneous and substantially no penetration into the interior of said carrier takes place.

4. A method of making a catalyst composition which comprises providing a porous carrier material of suitable particle size, heating the same, providing a compound of a catalytic metal intimately dispersed in a liquid organic medium, the temperature of said carrier being above the vaporization point of said liquid, and spraying said liquid onto said carrier, whereby evaporation of said liquid is substantially instantaneous and substantially no penetration into the interior of said carrier takes place, said metal being taken from the class consisting of platinum, rhodium, ruthenium and palladium.

CHRISTIAN W. KEITEL.
THOMAS J. WALSH.